March 11, 1952 R. E. TRAVIS 2,588,944
REFRIGERATOR CONSTRUCTION
Filed Nov. 12, 1949

INVENTOR.
Roy E. TRAVIS.
BY
Robert A. Sloman
ATTORNEY.

Patented Mar. 11, 1952

2,588,944

UNITED STATES PATENT OFFICE 2,588,944

REFRIGERATOR CONSTRUCTION

Roy E. Travis, Dearborn, Mich.

Application November 12, 1949, Serial No. 126,846

2 Claims. (Cl. 62—117)

This invention relates to cabinet constructions and more particularly to a refrigerator cabinet construction adapted for use in a vehicle such as a house trailer.

Heretofore the trailer wheel housing projects up into the interior of the trailer encroaching upon the interior space thereof, and where a conventional refrigerator cabinet, or for that matter any cabinet is mounted within such trailer upon the wheel housing there is usually a considerable loss of space equal to the height, width and length of that portion of the wheel housing which projects into said interior.

It is the object of the present invention to provide a novel cabinet construction or a novel refrigerator cabinet construction which is cut away throughout its width at the rearward portion thereof at its lower end so as to cooperatively and snugly fit over said wheel housing.

It is the further object of this invention to provide such cabinet construction whereby the front portion thereof extends down to and engages the vehicle floor so as to be at the proper and convenient level.

It is the further object of this invention to provide a refrigerator cabinet construction whose lower rearward portion has been cut away corresponding to the height and width of the projecting wheel housing, throughout the width of said cabinet, so that said refrigerator cabinet will snugly project upon and over said wheel housing, with the front portion of said cabinet extending downwardly in front of said wheel housing for engagement with the vehicle floor.

These and other objects will be seen from the following specification and claims in conjunction with the appended drawing in which:

It will be understood that the above drawing illustrates merely a preferred embodiment of the invention and that other embodiments are contemplated within the scope of the claims hereafter set out.

Figure 1:
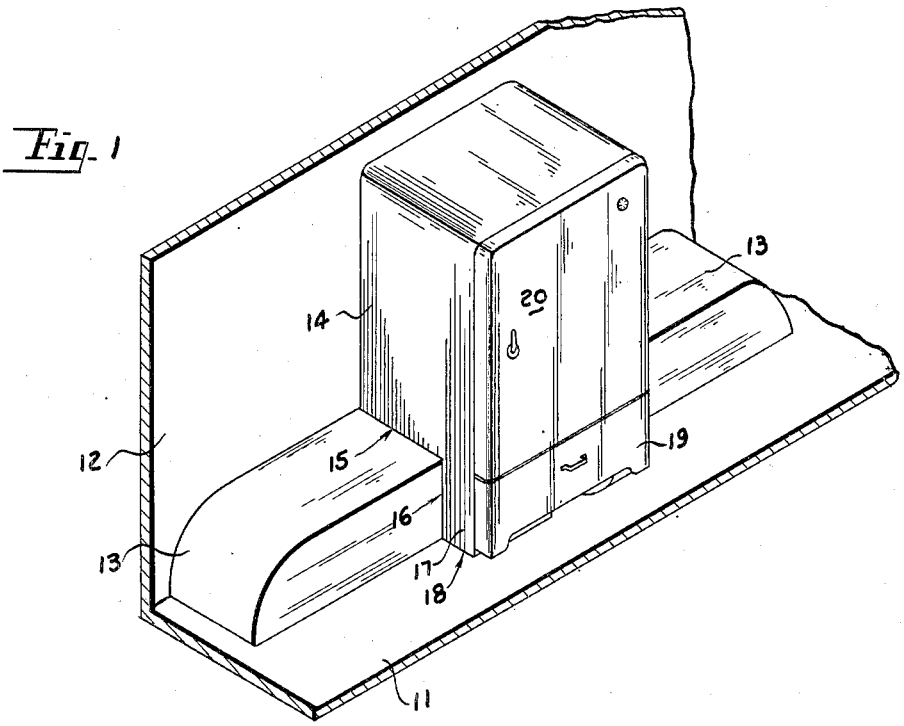
Fig. 1 is a fragmentary perspective view of the interior of a vehicle such as a house trailer illustrating the cut-away cabinet construction.

Referring to the drawing the interior of the vehicle such as a house trailer is generally indicated in Fig. 1 which shows a portion of a vehicle floor 11, the corresponding upright sidewall 12 and that portion of the wheel housing 13 which projects upwardly into the interior of said vehicle.

A refrigerator cut-away at its lower end rearwardly of its front portion in the manner hereafter described is mounted upon and snugly positioned over said wheel housing 13 with the rear wall of said refrigerator bearing against interior wall 12 and with the rear portion of the downwardly extending housing 17 bearing against the front upright wall of said wheel housing, and with the lower portion of said extending housing bearing against the floor 11.

The refrigerator cabinet includes the storage housing 14 of general rectangular cross-section, the rearward lower portion of which has been cut-away along the line 15 throughout its width, and also cut-away along the line 16 throughout its width.

This defines the downwardly depending housing of general rectangular cross-section 17, whose lower edges 18 cooperatively bear against the floor 11. This secondary housing 17 is adapted to have secured therein the usual mechanism of a refrigerator unit including the fan 23, a condenser 24, and the balance of the refrigerating mechanism which is generally indicated at 25.

The refrigerating mechanism hereafter referred to as a unit, forms no part of the present invention and for this reason further description thereof is omitted.

Figure 2:
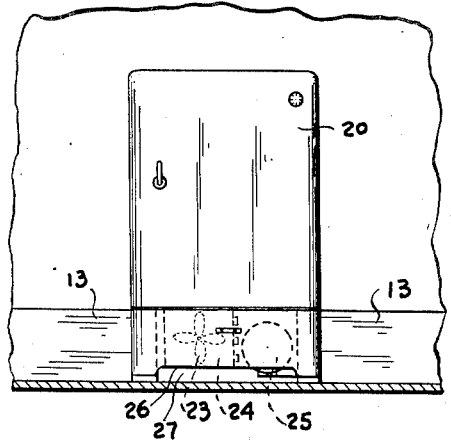
Fig. 2 is a front elevational view of the cabinet as mounted upon and over the wheel housing of a vehicle.

Panel or door 19 provides a closure for the housing 17 which contains a refrigerating mechanism, said panel being cut upwardly at 26 Fig. 2 to provide the longitudinal opening 27 permitting the introduction of air into the interior space 22 of said lower housing.

The lower portion of the storage housing 14 is defined by the horizontal floor 28, whose under surface bears upon the top surface of wheel housing 13, which floor projects outwardly to the outer portion of said housing, thereby defining a cover for lower housing 17.

A suitable hinged door 20 provides a separate closure for the storage housing 14, the outer surface of said door lying in vertical registry with the outer surface of the panel 19 for said lower housing 17. The interior of housing 14 is indicated at 21.

Figure 3:
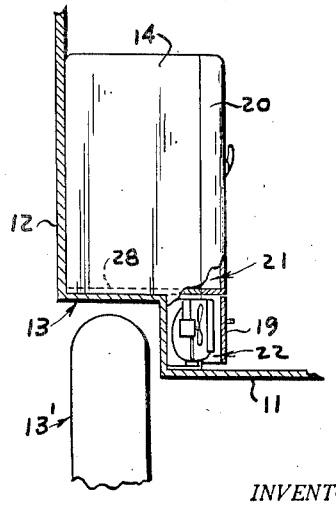
Fig. 3 is a fragmentary partially broken away elevational section taken from the left side of Fig. 2.

As fragmentarily shown in Fig. 3 the vehicle wheel 13' is shown projecting up into wheel housing 13 in the conventional manner.

While the above description described the refrigerator cabinet cut-away to be mounted over and against the wheel housing it is contemplated that the present invention include any type of cabinet which might be so mounted within a vehicle.

Having described my invention reference should now be had to the claims which follow for determining the scope thereof.

I claim:

1. In combination, a raised wheel enclosure of general rectangular cross-section projecting into the interior of a house trailer and extending longitudinally thereof, a refrigerator cabinet mounted upon said enclosure and consisting of a hollow storage housing of general rectangular cross-section throughout its width, a second forwardly arranged housing of general rectangular cross-section depending downwardly from the forward portion of said storage housing throughout its width to define a clearance space of rectangular cross-section throughout the width of said cabinet below said storage housing extending to the bottom of said second housing and behind said second housing extending to the rear of said storage housing to cooperatively receive said wheel enclosure, a refrigerating mechanism within said second housing, and a front panel on said second housing, the lower portion thereof being upwardly cut-away defining an air opening to the interior of said second housing.

2. In combination with a house trailer a floor, a side wall and a raised wheel enclosure of general rectangular cross-section projecting upwardly into the interior of said trailer above said floor and adjacent said wall, a refrigerator cabinet mounted upon said enclosure and snugly bearing against said wall and consisting of a hollow storage housing of general rectangular cross-section throughout its width, and a second forwardly arranged housing of general rectangular cross-section depending downwardly from the forward portion of said storage housing throughout its width to define a clearance space of rectangular cross-section throughout the width of said cabinet below said storage housing extending to the bottom of said second housing and behind said second housing extending to the rear of said storage housing to cooperatively receive said wheel enclosure, the lower end of said second housing bearing upon said floor.

ROY E. TRAVIS.

REFERENCES CITED

The following references are of record in the file of this patent:

UNITED STATES PATENTS

| Number | Name | Date |
|---|---|---|
| 458,738 | Palmer | Sept. 1, 1891 |
| 1,327,589 | Bunker | Jan. 6, 1920 |
| 1,602,178 | Spreen | Oct. 5, 1926 |
| 1,796,112 | McArthur, Jr. | Mar. 10, 1931 |
| 2,381,598 | Jones | Aug. 7, 1945 |
| 2,502,963 | Klee | Apr. 4, 1950 |

FOREIGN PATENTS

| Number | Country | Date |
|---|---|---|
| 462,622 | Great Britain | Mar. 12, 1937 |